Dec. 23, 1924.
A. M. DE VITALIS
1,520,227
FOOD HANDLING UTENSIL
Filed June 3, 1922    2 Sheets-Sheet 1
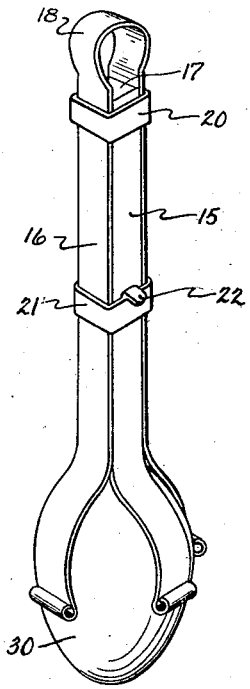
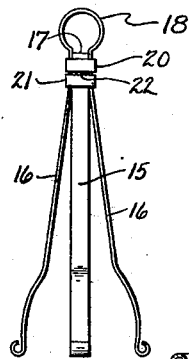
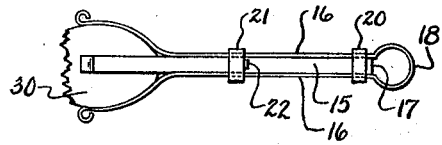
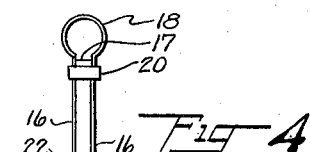
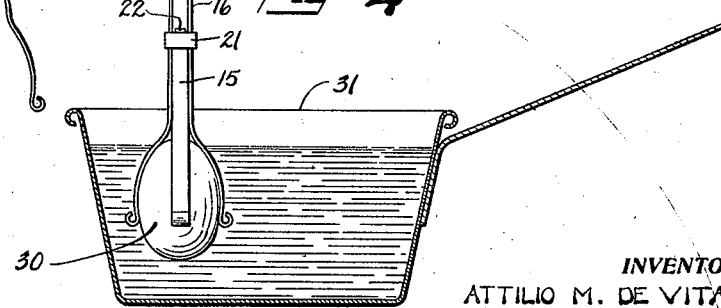
INVENTOR
ATTILIO M. DE VITALIS
BY George A. E. Lundell.
ATTORNEY Dec. 23, 1924.
A. M. DE VITALIS
1,520,227
FOOD HANDLING UTENSIL
Filed June 3, 1922   2 Sheets-Sheet 2
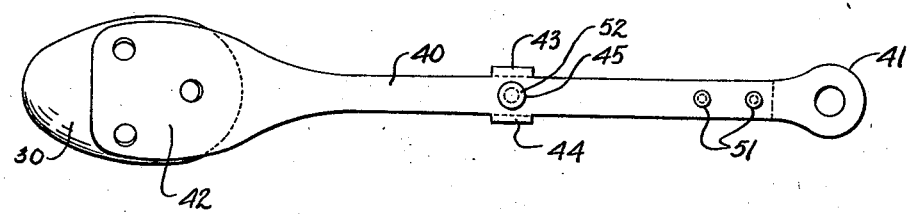
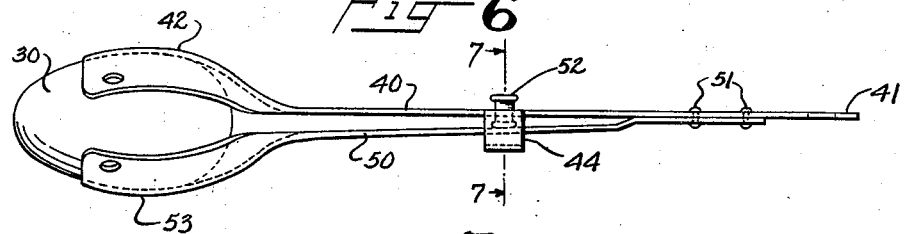
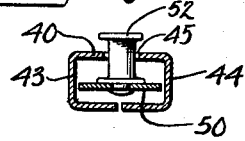
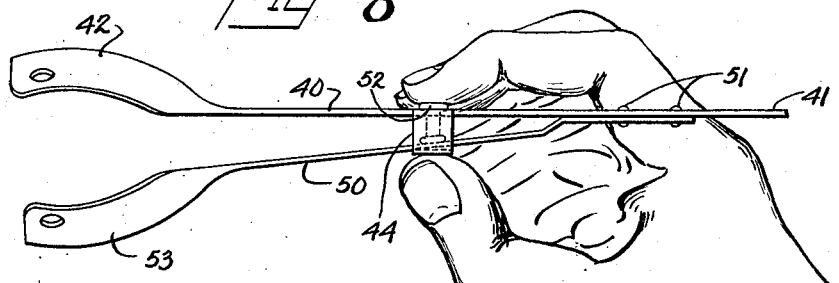
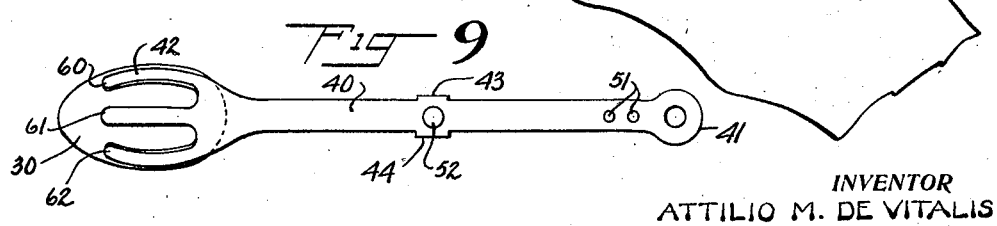
INVENTOR
ATTILIO M. DE VITALIS
BY George A. E. Kundell
ATTORNEY Patented Dec. 23, 1924.

1,520,227

UNITED STATES PATENT OFFICE.

ATTILIO M. DE VITALIS, OF NEW YORK, N. Y.

FOOD-HANDLING UTENSIL.

Application filed June 3, 1922. Serial No. 565,671.

*To all whom it may concern:*

Be it known that I, ATTILIO M. DE VITALIS, of New York, county and State of New York, and a citizen of the United States of America, have invented certain new and useful Improvements in Food-Handling Utensils, of which the following is a specification.

This invention relates to food handling utensils, and more particularly to utensils employed in the process of preparing eggs and the like for food.

Broadly stated, it is the object of my invention to provide improved means for seizing articles such as eggs, so that they may be submerged in or withdrawn from a heated fluid medium, readily, conveniently and efficiently, and for holding the eggs while being opened.

More particularly, it is one object of the invention to provide an egg seizing instrumentality which may be easily and cheaply manufactured in large quantities.

Another object relates to the provision of an egg seizing device of pleasing and attractive form and improved construction, including finger pressed means for actuating the device.

Other objects will appear from the following description, taken in connection with the accompanying drawings, in which, Figure 1 is a perspective view of one form of the invention in operated position;

Figure 2 is a side elevation of the device of Figure 1 in open position;

Figure 3 is a side elevation of the device holding an opened egg;

Figure 4 is a view of the device of Figure 1 in a cooking medium;

Figure 5 is a side elevation and Figure 6 is an end view of another form of the invention;

Figure 7 is a section taken on the line 7—7 of Figure 6;

Figure 8 is a view of the device of Figures 5 and 6 in opened position; and

Figure 9 is a side elevation of a further modification of the invention.

Like reference characters denote like parts in the several figures of the drawings.

One form of the holding device of my invention comprises a pair of elongated, resilient sheet metal strips 15 and 16 at right angles to one another, each bent into U shape as indicated in Figure 1. The horizontal portion 17 of the U shaped member 15 is positioned substantially at right angles to the lateral portions thereof. The corresponding portion 18 of the U shaped member 16 is spaced apart from the portion 17 of the strip 15 and is curved outwardly as shown to form a handle or supporting eye by which the device may be conveniently held or supported on a hook or other projection when desired.

At or near the portion 17 of the member 15 there is provided an attachment member 20 formed of a sheet metal strip encircling the two U shaped members 15 and 16 and secured thereto in any desired manner by welding. Slidably mounted on the lateral elongated portions of the members 15 and 16, and encircling the same is a rectangularly bent metal strip 21 preferably having an outwardly extending ear 22 for convenient manipulation thereof. The resiliency of the members 15 and 16 is such as to normally tend to maintain the respective free ends in a position such as shown in Figure 2, in which the slide 21 is assumed to be in the position nearest to the attachment member 20.

The free ends of the members 15 and 16 are curved so as to form a portion of an ellipse, the extreme end being sharply bent to form a bead. The arrangement is such that when the slide 21 is in the position shown diagrammatically in Figure 3, i. e., spaced apart from the attachment member 20, an egg 30 may be held securely within the four prongs so formed. Thus an egg may be readily and conveniently positioned within the prongs while the holder is distended as in Figure 2, and by manually slipping the slide 21 towards the egg, the egg may be securely held and deposited in a kettle 31 containing boiling water so as to prepare the egg for cooking. The holder is preferably removed from the egg during the cooking operation for use in holding another egg.

The device has perhaps its widest application and greatest utility in withdrawing the cooked egg from the boiling medium. Hitherto, it has been the practice to use for the purpose a large spoon or other similar device and this has resulted in a large amount of breakage. With the holder of the present invention the egg may readily, conveniently and safely be withdrawn from the boiling fluid by seizing the egg while in the water in a manner already described.

In the modified form of the invention shown in Figures 5 to 8 inclusive there is provided a metal strip 40 having one end 41 enlarged and perforated to form a supporting eye for the device. The other end 42 is enlarged and bent as shown in Figure 6, to conform to the shape of an egg. The strip 40 is provided at an intermediate point with a pair of lateral extensions 43, 44, which are bent into rectangular shape as shown in Figure 7, to form a casing. Proximate to these extensions and on substantially the center line of the strip 40 there is provided a circular perforation 45 for a purpose which will be subsequently set forth.

Extending through the rectangular casing formed by the extensions 43 and 44 and the strip 40 is a second strip 50 somewhat less in length than the strip 40, and attached thereto in any suitable manner by rivets 51. A double headed stud or button 52 is attached to the strip 50 at a point opposite the perforation 45, its shank extending through said perforation so as to be supported and guided therein.

The free end 53 of the strip 50 is bent as shown in Figure 6 to conform to the shape of an egg. The resiliency of the strips 40 and 50 is such as to tend to maintain the free ends of the strips in closed position.

The device may be distended by pressure of the finger on the outer bead of the button 52 in the manner clearly illustrated in the Figure 8, the free ends 42 and 53 may then be readily and conveniently positioned around an egg and upon releasing the button will close thereon due to the tension in the strips 50, as illustrated in Figure 6, the device may be employed in the manner previously described for withdrawing an egg from a boiling medium.

In the modified form of the invention shown in Figure 9 the free end 42 of the strip 40 is provided with a plurality of prongs 60, 61 and 62 for contracting with the surface of the egg. By varying the tension in these prongs the pressure upon the egg may be varied as desired.

While I have shown and described several forms of the invention for the purpose of illustration, it is understood that the scope of the invention is not to be limited thereby, reference being had to the appended claims for that purpose.

What I claim is:—

1. An egg handling utensil comprising a pair of resilient members bent into U shape and positioned at right angles to one another, and means for securing said members together at or near their respective middle portions, the free ends being formed to correspond to the shape of an egg.

2. An egg handling utensil comprising a pair of resilient members bent into U shape and positioned at right angles to one another, means for securing said members together at or near their respective middle portions, and slidable means for varying the distension of the members, the free ends being formed to correspond to the shape of an egg.

3. An egg handling utensil comprising a pair of resilient members bent into U shape and positioned at right angles to one another, the resiliency being such as to tend to force the ends of the members apart, means for securing said members together at or near their respective middle portions, and slidable means for varying the distension of the members, the free ends being formed to correspond to the shape of an egg.

4. An egg handling utensil comprising a pair of resilient members bent into U shape and positioned at right angles to one another, the resiliency being such as to tend to force the ends of the members apart, means for securing said members together at or near their respective middle portions, and slidable means for varying the distension of the members, the free ends being formed to correspond to the shape of an egg, one of said members having an arcuate extension at its intermediate portion to form a supporting eye for the utensil.

In testimony whereof I hereunto affix my signature.

ATTILIO M. DE VITALIS.